(12) United States Patent
Thatcher et al.

(10) Patent No.: US 11,452,268 B2
(45) Date of Patent: Sep. 27, 2022

(54) SYSTEM AND METHOD FOR TRANSMITTING DATA WITHIN AN IRRIGATION SYSTEM

(71) Applicant: Valmont Industries, Inc., Omaha, NE (US)

(72) Inventors: Tracy A. Thatcher, Gretna, NE (US); John Kastl, Wahoo, NE (US)

(73) Assignee: Valmont Industries, Inc., Omaha, NE (US)

( * ) Notice: Subject to any disclaimer, the term of this patent is extended or adjusted under 35 U.S.C. 154(b) by 310 days.

(21) Appl. No.: 16/885,543

(22) Filed: May 28, 2020

(65) Prior Publication Data
US 2020/0404866 A1    Dec. 31, 2020

Related U.S. Application Data

(60) Provisional application No. 62/867,290, filed on Jun. 27, 2019.

(51) Int. Cl.
| | |
|---|---|
| A01G 25/09 | (2006.01) |
| G02B 6/36 | (2006.01) |
| H04B 10/25 | (2013.01) |
| A01G 25/02 | (2006.01) |
| H04B 10/40 | (2013.01) |

(52) U.S. Cl.
CPC ........... *A01G 25/02* (2013.01); *A01G 25/092* (2013.01); *G02B 6/3604* (2013.01); *H04B 10/2589* (2020.05); *H04B 10/40* (2013.01)

(58) Field of Classification Search
CPC . A01G 25/092; G02B 6/3604; H04B 10/2589
See application file for complete search history.

(56) References Cited

U.S. PATENT DOCUMENTS

| | | | |
|---|---|---|---|
| 5,255,857 A | 10/1993 | Hunt | |
| 6,755,362 B2* | 6/2004 | Krieger | A01G 25/092 239/731 |
| 6,874,707 B2 | 4/2005 | Skinner | |
| 7,097,113 B2 | 8/2006 | Ivans | |
| 7,165,730 B2 | 1/2007 | Clark et al. | |
| 7,805,221 B2 | 9/2010 | Nickerson | |
| 7,996,192 B2 | 8/2011 | Repelli et al. | |
| 8,630,743 B2 | 1/2014 | Marsters et al. | |
| 9,241,439 B2 | 1/2016 | Zunhammer | |
| 9,258,952 B2 | 2/2016 | Walker et al. | |
| 2002/0107582 A1 | 8/2002 | Pollak et al. | |
| 2003/0066912 A1 | 4/2003 | Krieger et al. | |
| 2014/0129039 A1 | 5/2014 | Olive-Chahinian et al. | |
| 2016/0366841 A1 | 12/2016 | Wilson | |

(Continued)

*Primary Examiner* — Sung H Pak
(74) *Attorney, Agent, or Firm* — Milligan PC LLO

(57) ABSTRACT

The present invention provides a fiber-optic communication system that allows high-bandwidth communications between components of an irrigation machine. In accordance with a preferred embodiment, the present invention teaches a system and method for providing a two-way communications link between a pivot controller panel and distributed irrigation machine components. According to further preferred embodiments, the two-way communications link of the present invention may also convert optical signals to electrical signals and route those signals to the appropriate connected devices.

21 Claims, 7 Drawing Sheets

(56) References Cited

U.S. PATENT DOCUMENTS

| | | |
|---|---|---|
| 2017/0164569 A1 | 6/2017 | Andrews et al. |
| 2017/0251589 A1 | 9/2017 | Tippery et al. |
| 2018/0014452 A1 | 1/2018 | Starr |
| 2018/0085763 A1 | 3/2018 | Leckner |
| 2018/0192599 A1 | 7/2018 | Rodriguez et al. |

* cited by examiner

SYSTEM AND METHOD FOR TRANSMITTING DATA WITHIN AN IRRIGATION SYSTEM

RELATED APPLICATIONS

The present application claims priority to U.S. Provisional Application No. 62/867,290 filed Jun. 27, 2019.

BACKGROUND AND FIELD OF THE PRESENT INVENTION

Field of the Present Invention

The present invention relates generally to a system and method for managing an irrigation system and, more particularly, to a system and method for transmitting data within an irrigation system.

Background of the Invention

Modern center pivot and linear irrigation systems generally include interconnected conduits and spans (e.g., irrigation spans) attached to one or more tower structures which support and move the conduits during irrigation. In turn, the conduits are further attached to sprinkler/nozzle systems which spray water (or other applicants) in a desired pattern. In these modern irrigation systems, a significant number of powered elements are used to control various aspects of irrigation. This requires providing power and control signals to a variety of sensors, sprayers, drive control systems, motors, transducers and a variety of other systems.

At present, mechanized irrigation systems primarily use individual wires to control the irrigation machine and to transport data from sensors and other equipment back to the control panel of the machine. These wires transmit ON/OFF signals to control various functions of a given machine (e.g. machine forward, machine reverse, machine duty cycles, end gun control, safety circuit, auxiliary control and the like). Due to the length of many irrigation machines (between 0.25 and 0.5 miles), this type of system has become very costly since additional wires and related hardware are required for each additional function. Further, the systems of the prior art are designed only for control signals and thus do not allow for data to be transmitted down the machine beyond simple pulse width modulated signals. Wireless components have been used to overcome these limitations, but they have proven to be unreliable and expensive.

More recent developments have included power line carrier communications wherein digital control signals and data (most commonly GPS correction data) are transmitted via a carrier wave over either a wire carrying electrical power or a single dedicated wire (multiplex control). Further developments have also included a dedicated control circuit operating on a variety of protocols including serial connections (e.g. RS-232, RS-485), Ethernet and the like. These types of systems, while more versatile and cost effective than hard-wired systems, have been limited in their ability to transmit large amounts of data efficiently and reliably. These problems are caused by the voltage drop over distances exceeding 0.25 miles and induced voltage/noise from adjacent power wires and drive motors. Further these systems are sensitive to EMI and RMI when used near high voltage power lines. In addition, due to the moist environment, corrosion of electrical connections is also a known problem.

With the advent of precision agriculture, especially the need to apply variable rates of irrigation and other applicants to a given field, improved systems are needed to better monitor machine conditions and to communicate with advanced motor controllers.

SUMMARY OF THE PRESENT INVENTION

To address the shortcomings of the prior art, the present invention provides a fiber-optic communication system that allows high-bandwidth communications between components of an irrigation machine. In accordance with a preferred embodiment, the present invention teaches a system and method for providing a two-way communications link between a pivot controller panel and distributed irrigation machine components. According to further preferred embodiments, the two-way communications link of the present invention may also convert optical signals to electrical signals and route those signals to the appropriate connected devices.

According to further embodiments of the present invention, at various nodes across the irrigation machine, the optical data stream may be intercepted and translated to electrical signals for connection to various data creating and consuming devices. According to at least one embodiment of the present invention, combinations of optical splitters, converters and amplifiers may be used to convert system data into optical signals for transmission. Thereafter, the system components may preferably reconvert the optical signals to electrical signals for local processing by attached devices.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, a variety of changes and modifications can be made within the scope of the invention without departing from the spirit thereof.

The accompanying drawings constitute part of the specification and illustrate various embodiments of the present invention together with the description.

BRIEF DESCRIPTION OF THE DRAWINGS

FIG. 4A shows a block diagram of a second portion of the exemplary system shown in

FIG. 3A.

DESCRIPTION OF THE PREFERRED EMBODIMENTS

Figure 1:
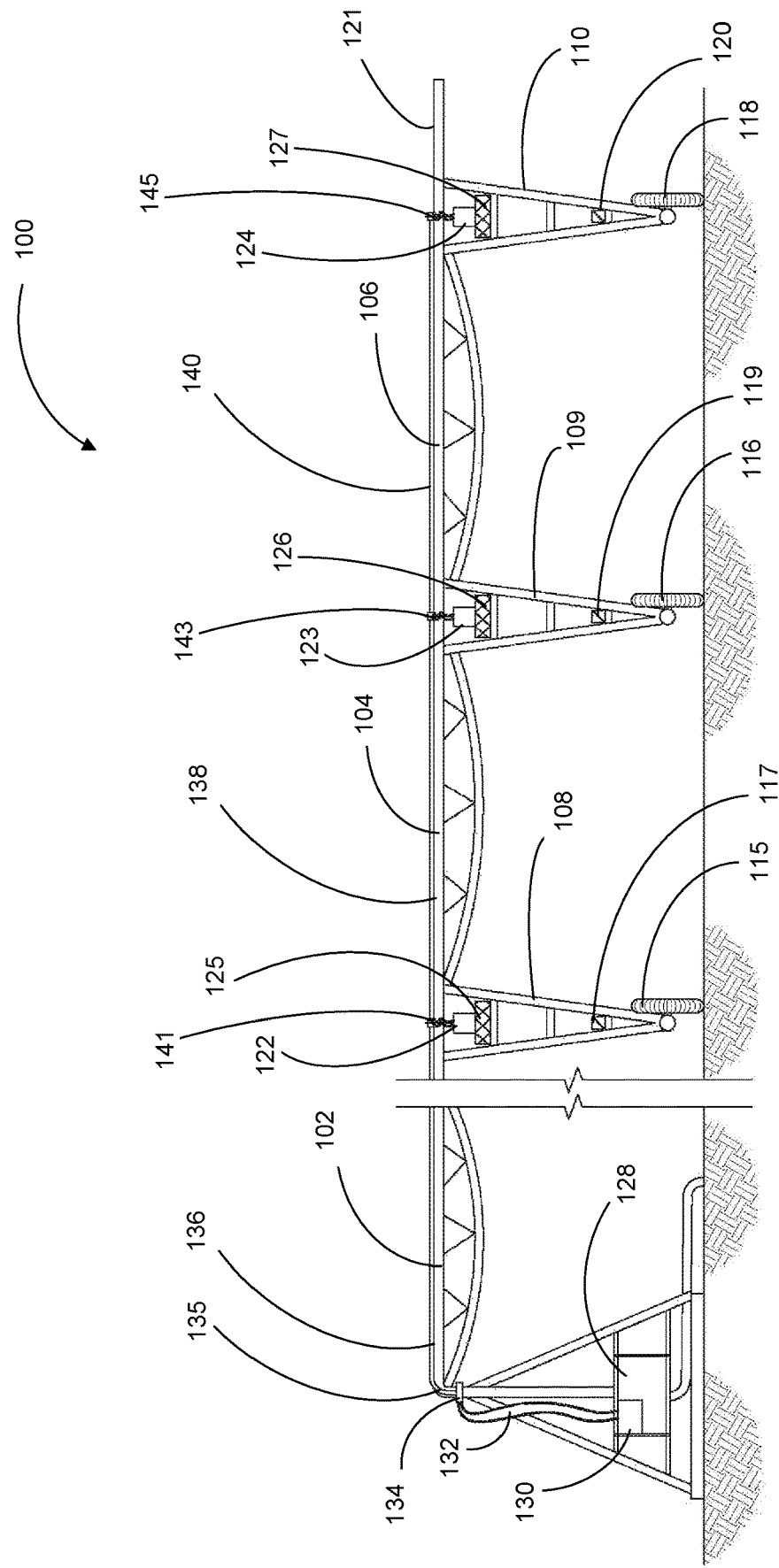
FIG. 1 shows an exemplary irrigation system in accordance with a preferred embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

In accordance with preferred embodiments of the present invention, it should be understood that the term "drive unit" may preferably include a number of sub-components including: a motor, a controller, a communication device (such as a PLC or the like) and an alignment device. Further, while the invention is discussed below with respect to three exemplary towers, the number of towers used may be expanded or reduced (i.e. 1-100 towers) as needed without departing from the spirit of the present invention. Further, the term "motor" as used herein may refer to any suitable motor for providing torque to a drive wheel. Accordingly, the term "motor" as used herein may preferably include motors such switch reluctance motors, induction motors and the like.

The terms "program," "computer program," "software application," "module," "firmware" and the like as used herein, are defined as a sequence of instructions designed for execution on a computer system. The term "solid state" should be understood to refer to a range of solid state electronic devices which preferably include circuits or devices built from solid materials and in which the electrons, or other charge carriers, are confined entirely within the solid material. Exemplary solid-state components/materials may include crystalline, polycrystalline and amorphous solids, electrical conductors and semiconductors. Common solid-state devices may include transistors, microprocessor chips, and RAM.

A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory (e.g. ROM, flash memory, CD-ROM, DVD, and other permanent storage media) and volatile memory (e.g. RAM, buffers, cache memory, and signals within network circuits) without limitation.

Aspects of the systems and methods described herein may be implemented as functionality programmed into any of a variety of circuitry, including programmable logic devices (PLDs), application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types.

FIGS. 1-5 illustrate various configurations of irrigation systems which may be used with example implementations of the present invention. The irrigation systems shown in FIGS. 1-5 are only exemplary systems onto which the features of the present invention may be integrated. Accordingly, FIGS. 1-5 are intended to be purely illustrative and any of a variety of alternative systems (i.e. fixed systems as well as linear and center pivot self-propelled irrigation systems; stationary systems; corner systems) may be used with the present invention without limitation. For example, although FIG. 1 is shown as a center pivot irrigation system, the present invention may also be implemented as a linear irrigation system. The example irrigation system 100 is not intended to limit or define the scope of the present invention in any way. According to further preferred embodiments, the present invention may be used with a variety of motor types such as gas powered, DC powered, switch reluctance, single phase AC and the like.

With reference now to FIG. 1, an exemplary irrigation system 100 in accordance with a preferred embodiment of the present invention is provided. As shown, the irrigation system 100 includes spans 102, 104, 106 supporting drive towers 108, 109, 110. Further, each drive tower 108, 109, 110 is shown with respective drive controllers 125, 126, 127. For each drive tower, 108, 109, 110, the respective drive controllers 125, 126, 127 may generally control respective drive motors 117, 119, 120 and drive wheels 115, 116, 118. Further, the irrigation machine 100 may include an extension/overhang 121 which may include an end gun (not shown).

As shown, the exemplary irrigation system 100 includes a control/pivot panel 128 which includes processors and modules to monitor and control the irrigation system 100 as discussed further below. According to a preferred embodiment, the present invention includes a fiber optic system including fiber optic cables and fiber optic components for transmitting signals throughout the irrigation system.

As discussed further below, the fiber optic system of the present invention may form an active optical network (AON), a passive optical network (PON) or a hybrid including both active and passive components. For example, any of the fiber optic components used with the present invention may be active, passive or hybrid. Examples of passive components may preferably include Fused Biconic Tampered (FBT) splitters or the like. Examples of active components for use with the present invention may preferably include active optical components such as Planar Lightwave Circuit (PLC) splitters or the like. Additionally, optical filters may be used with any of the components of the present invention including passive and active filters without limitation. These optical filters may include photonics based filters such as RF photonics filters, Microwave filters, Si RF filters and the like.

With reference again to FIG. 1, the exemplary system 100 includes a fiber optic conversion module 130 for receiving signals from the pivot controller 128 and transmitting the received signals via fiber optic cable 132 to the various components of the present invention as discussed further below. Preferably, the fiber optic cables of the present invention may include any of a variety of single mode and/or multimode optical fibers.

According to a first preferred embodiment, the fiber optic cable 132 of the present invention may link to downstream fiber optic cables 135 via a fiber optic rotary joint slip ring 134 or the like. The downstream fiber optic cables 135 may include fiber optic cables 136, 138, 140 attached to each respective span 102, 104, 106 of the irrigation system 100. A first portion of the fiber optic cable 136 may link to a first fiber optic component 141 which allows transmission of optical signals to and from a first fiber optical converter box 122. According to a preferred embodiment, the first fiber optic component may be a passive or active fiber optic component. According to a first preferred embodiment, the first fiber optic component 141 may be a fiber optic splitter which may receive fiber optic signals and split/distribute the signals to the first fiber optical converter box 122 and at least one downstream fiber optic cable 138 as discussed further below.

According to further preferred embodiments, the signal converters of the present invention may incorporate or be linked to a multiplexer which is configured to permit the transmission of multiple signals at the same time. A preferred multiplexer in accordance with the present invention may transmit signals using time-division or wavelength-division multiplexing. Additionally, the optical cables for use with the present invention may be of any kind including single mode or multimode optical fiber cables.

According to a preferred embodiment, the first fiber optic component 141 may be a Fused Biconic Tapered (FBT) splitter. Alternately, the first fiber optic component 141 may be a Planar Lightwave Circuit (PLC) splitter. According to preferred embodiments, sections of the fiber optic cables of the present invention may include optical fiber connectors to allow for connection and disconnection to devices and other cable sections.

According to an alternative preferred embodiment, the first fiber optic component 141 may be an active/powered fiber optic component such as a router or switch aggregator. In this case, the first fiber optic component 141 may process fiber optic signals and actively route only selected signals to identified components. According to a further preferred embodiment, the component 141 may actively buffer and perform layer 2 switching and/or layer 3 switching and routing to received signals.

With reference again to FIG. 1, fiber optic signals from the first fiber optic component 141 are preferably further transmitted to at least one downstream fiber optic cable 138. The signal is then routed to a second fiber optic component 143 which preferably splits the signal between a second fiber optical converter box 123 and at least one downstream fiber optic cable 140. Thereafter, the signals are then routed to a third fiber optic component 145 which preferably provides the signals to a third fiber optical converter box 124. Although not shown, any number of additional downstream fiber optic components may be added to the present invention without limitation. Further, each optical component discussed herein may be of the same type or may be different as needed.

As discussed further below, the irrigation machine 100 may preferably include a wide assortment of mechanical and powered elements. For example, sprinklers, nozzles, end-guns and sprayers may be included. Further, powered elements such as transducers, valve controllers, and sensors may be included without limitation. Additionally, the present invention may include any number of drive towers which may be of any type (including unmotorized) without departing from the scope of the present invention. Preferably, the drive controllers 125, 126, 127 and related functions may be performed by solid state components (e.g. solid-state motor controllers, non-contact alignment devices and other components) or the like.

Figure 2:
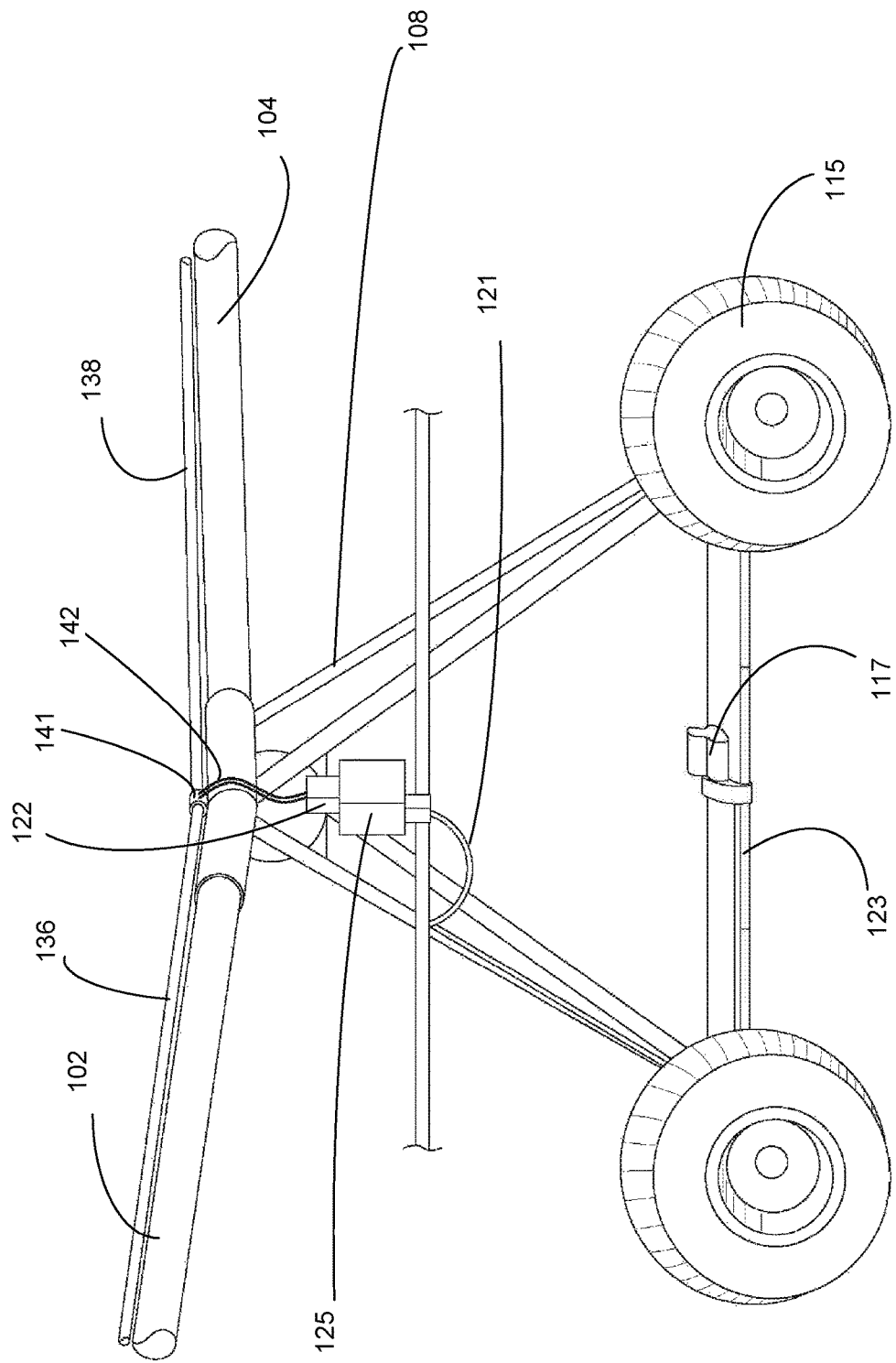
FIG. 2 shows a detailed view of an exemplary drive tower in accordance with a preferred embodiment of the present invention.

With reference now to FIG. 2, an enlarged view of an exemplary drive tower 108 is provided. As shown, the drive tower 108 supports two connected spans 102, 104. The drive tower 108 includes a drive controller 125 which is electrically connected via a wire 121 (e.g. electrical lines for providing power transmission) to a drive motor 117. As further shown, the drive motor 117 is mechanically engaged with a drive shaft 123 which applies torque to one more drive wheels 115. According to preferred embodiments, the drive controller 125 and other control elements within the present invention may be solid-state controllers as disclosed in U.S. Provisional Application No. 62/537,026 filed Jul. 26, 2017 which is hereby incorporated by reference herein in its entirety.

As discussed above, the span-mounted fiber optic cable 136 may preferably transmit fiber optic signals to a first fiber optic component 141. The first fiber optic component 141 may preferably split the fiber optic signal and direct the signal via a connecting tower fiber optic cable 142 to the first fiber optical converter box 122. According to a preferred embodiment, the fiber optical converter 122 may translate the optical signals to electrical signals for processing by the drive controller 125. In reverse, the fiber optical converter 122 preferably also translates electrical signals from the drive controller 125 for transmission to the control/pivot panel 128 as discussed further below or to other components in the system (e.g. other drive controllers 126, 127) attached to the fiber optic communications system. Additionally, the first fiber optic component 141 may transmit the fiber optic signal to at least one downstream fiber optic cable 138 as discussed further below.

Figure 3A:
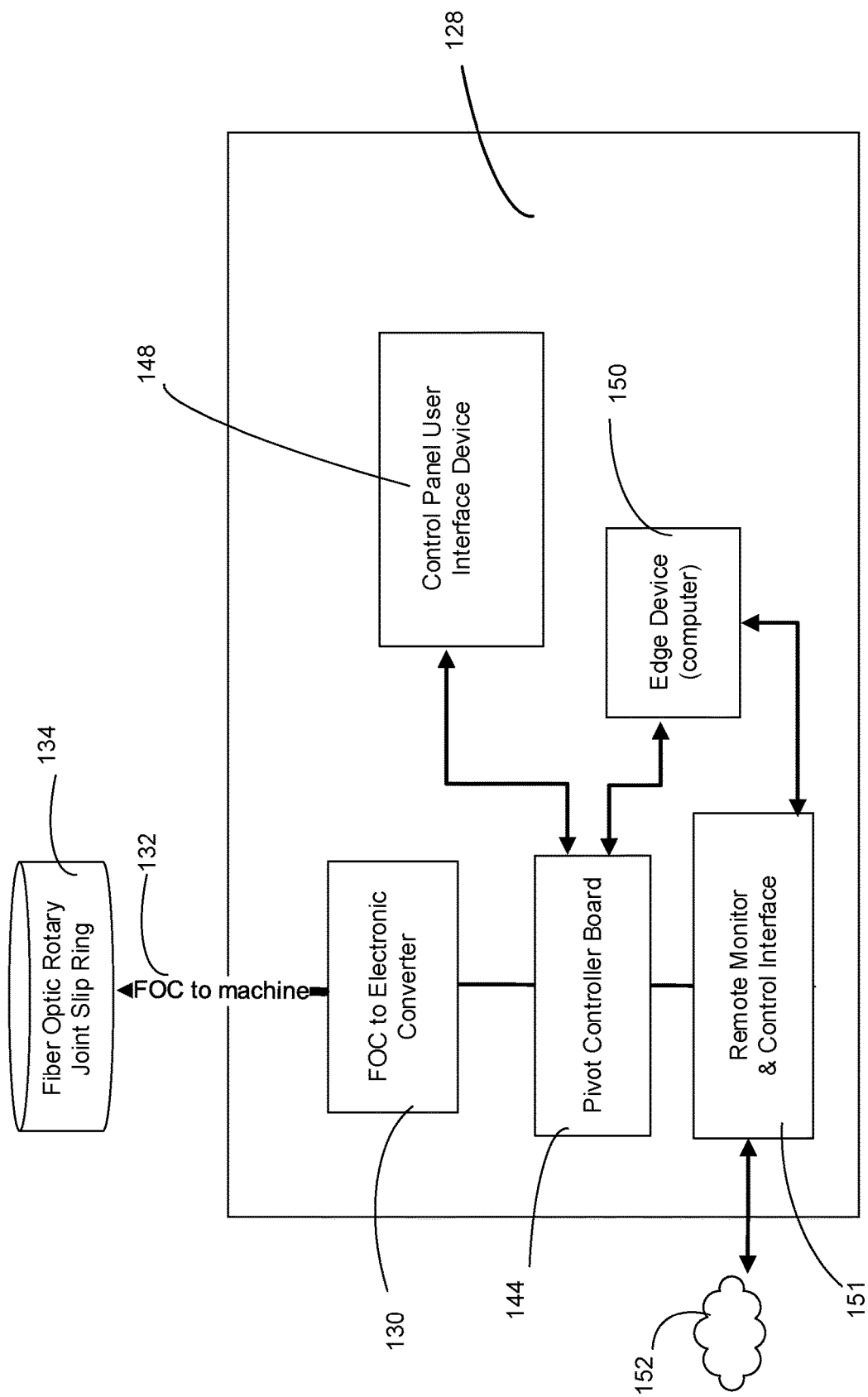
FIG. 3A shows a block diagram illustrating an exemplary system for use with the present invention.

With reference now to FIG. 3A, an exemplary control/pivot panel 128 which represents functionality to control one or more operational aspects of the irrigation system shall now be discussed. As shown in FIG. 3A, an exemplary control/pivot panel 128 may preferably include a controller board/processor 144. The controller board/processor 144 preferably may include any number of processors, microcontrollers, or other processing systems. The controller board/processor 144 may preferably store and execute software programs that implement techniques described herein.

The control/pivot panel 128 may also include and/or connect to other components. These may include a user interface panel 148 for receiving user input and/or a remote monitor and control interface module 151 for allowing remote access to the system via an IOT cloud 152 or the like. The control/pivot panel 128 may further include a dedicated edge computing device/module 150 or the like to process system created data. Although not shown, the control/pivot panel 128 may also include a power control system and a power-line BUS which may include conductive transmission lines, circuits and the like for controlling and routing electric power and signals via a power-line carrier system as discussed further below.

As discussed above, the present invention provides a two-way communications link between the pivot controller board 144 and an optical converter 130 which converts incoming and outgoing signals between the pivot controller and the downstream fiber optic cable 132. The communications discussed herein may be one or two-way in nature (i.e. bidirectional). Accordingly, the data links and components of the present invention preferably: 1) convert electrical signals to fiber optic signals for transmission; and then 2) convert fiber optic signals to electrical signals for processing by respective pivot and drive tower controllers. The pivot controller 144 may then further route received data to the appropriate connected devices.

Figure 3B:
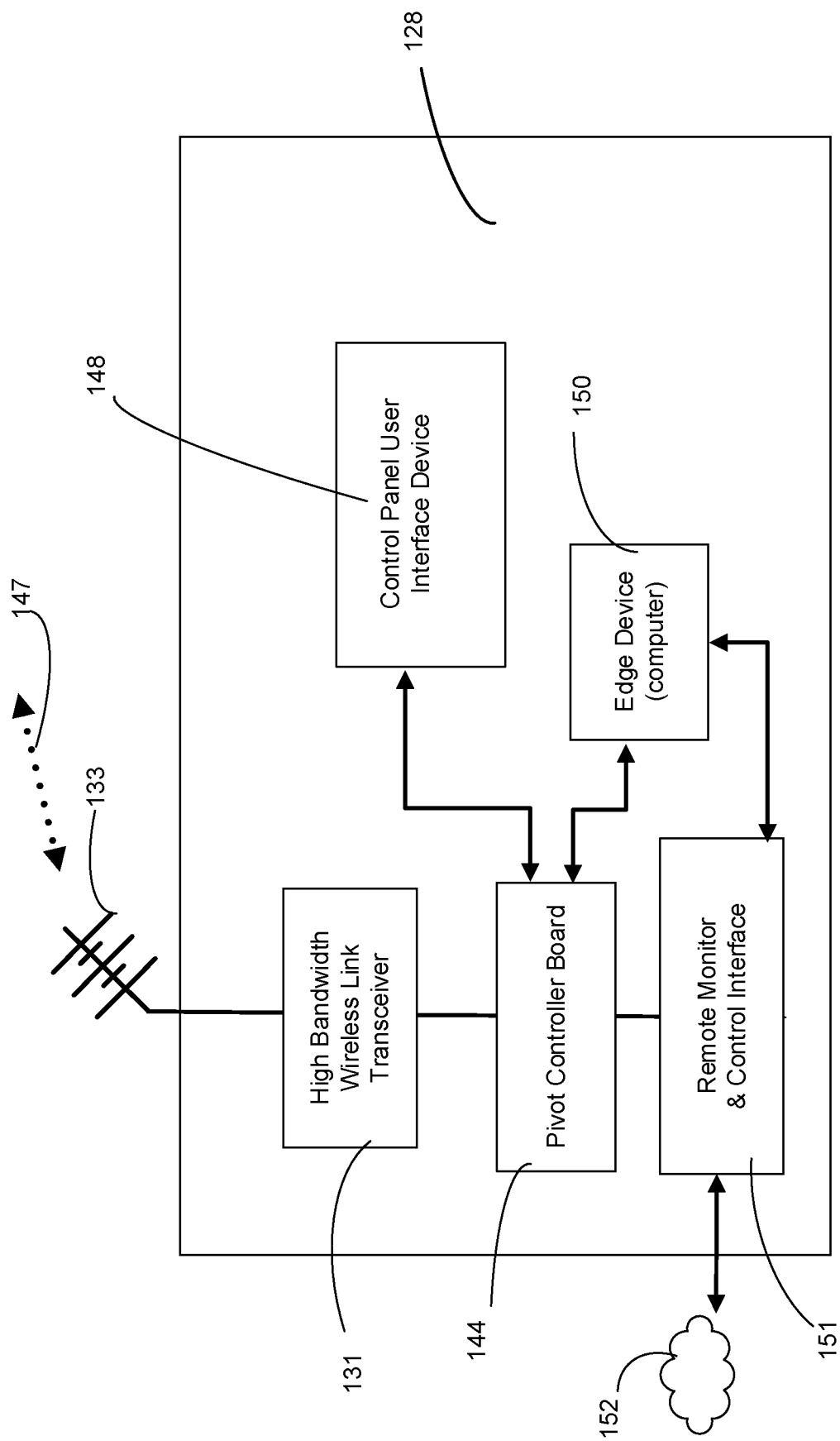
FIG. 3B shows a block diagram illustrating a further alternative system for use with the present invention.

With reference now to FIG. 3B, a block diagram illustrating a further alternative system for use with the present invention is shown. As illustrated, the system of the present invention may alternatively incorporate a wireless transceiver 131 or the like as an alternative to the optical slipring 134. Preferably, such a wireless transceiver 131 may be a short hop radio component or the like. As shown in FIG. 3B, an alternative embodiment may use a high bandwidth wireless transceiver 131 and paired antenna 133 to provide a bidirectional wireless signal 147 which may be exchanged with another receiver or span 102. According to a preferred embodiment, the system may use a microwave transceiver or a similar high bandwidth wireless system to transmit between the pivot panel and one or more receivers located at any point within the system.

Figure 4A:
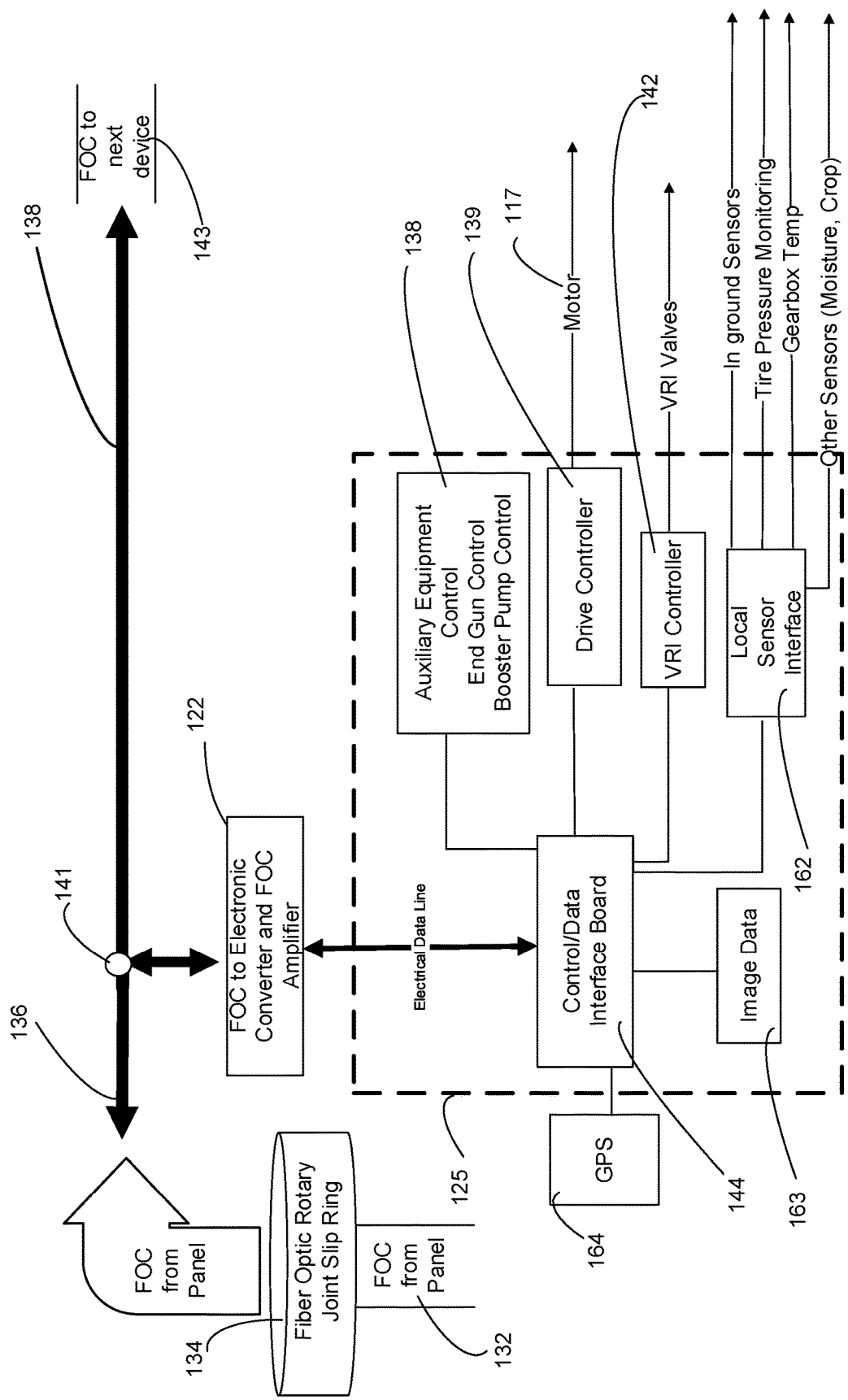

With reference now to FIG. 4A, the signal transmission from the fiber optic cable 132 and fiber optic rotary joint slip ring 134 to the downstream fiber optic cable 136 is shown. Thereafter, the fiber optic signals are preferably received by a first fiber optic component 141 which preferably splits and/or routes the signals to a first fiber optical converter 122 and at least one downstream fiber optic cable 138. The fiber optic joint slip rings for use with the present invention may include drum slip rings, flat slip rings or other slip ring designs without limitation.

At the first fiber optical converter 122, the received signal is re-converted to an electrical signal and routed to the controller/data interface board 144. The controller 144 may be linked to a wide variety of devices including: a GPS device/module 164 (for calculating and transmitting GPS corrections); image sensors 163 (such as videos cameras, cameras and IR cameras); spray controllers 138 (such as end gun controllers and booster pump controllers); a drive controller 139 (linked to the drive motor 117); VRI controllers 142; and other connected devices 162 (such as receivers for wireless signals from in ground sensors (e.g. soil/moisture sensors), tire pressure monitors, gearbox temperature monitors and the like).

Figure 4B:
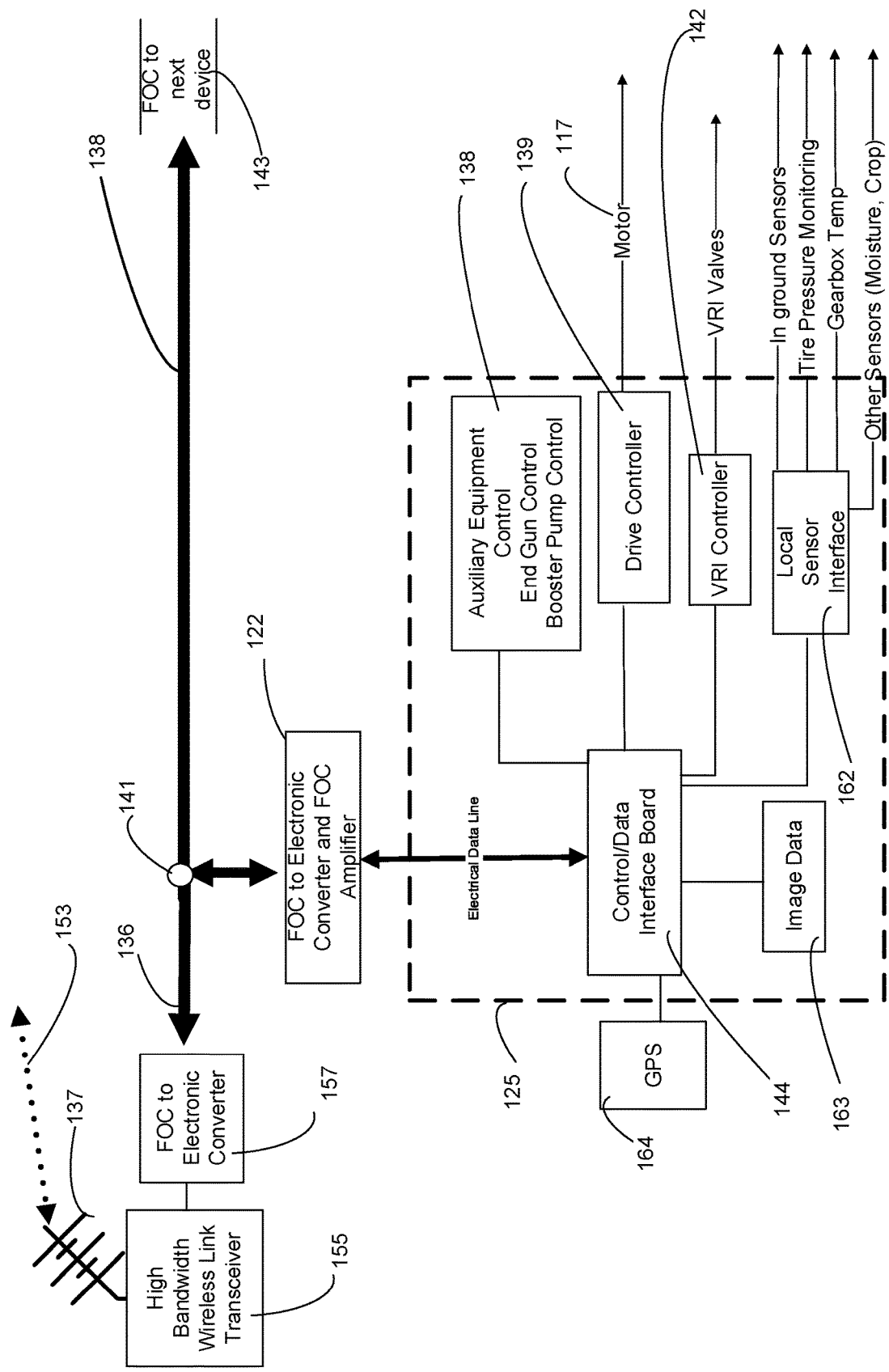
FIG. 4B shows a block diagram of the second portion of the exemplary system shown in FIG. 4A incorporating an alternative design.

With reference now to FIG. 4B, a block diagram illustrating a further alternative system for use with the present invention is shown. As illustrated, the system of the present invention may alternatively incorporate a wireless transceiver 137 or the like as an alternative to the optical slipring 134. As shown in FIG. 4B, an alternative embodiment may use a FOC converter 157, a high bandwidth wireless transceiver 155 and paired antenna 137 to provide a bidirectional wireless signal 153 which may be exchanged with the control panel 128 or with another receiver. According to a preferred embodiment, the system may use a microwave transceiver or a similar high bandwidth wireless system to transmit between the pivot panel 128 and one or more receivers located at any point within the system.

Figure 5:
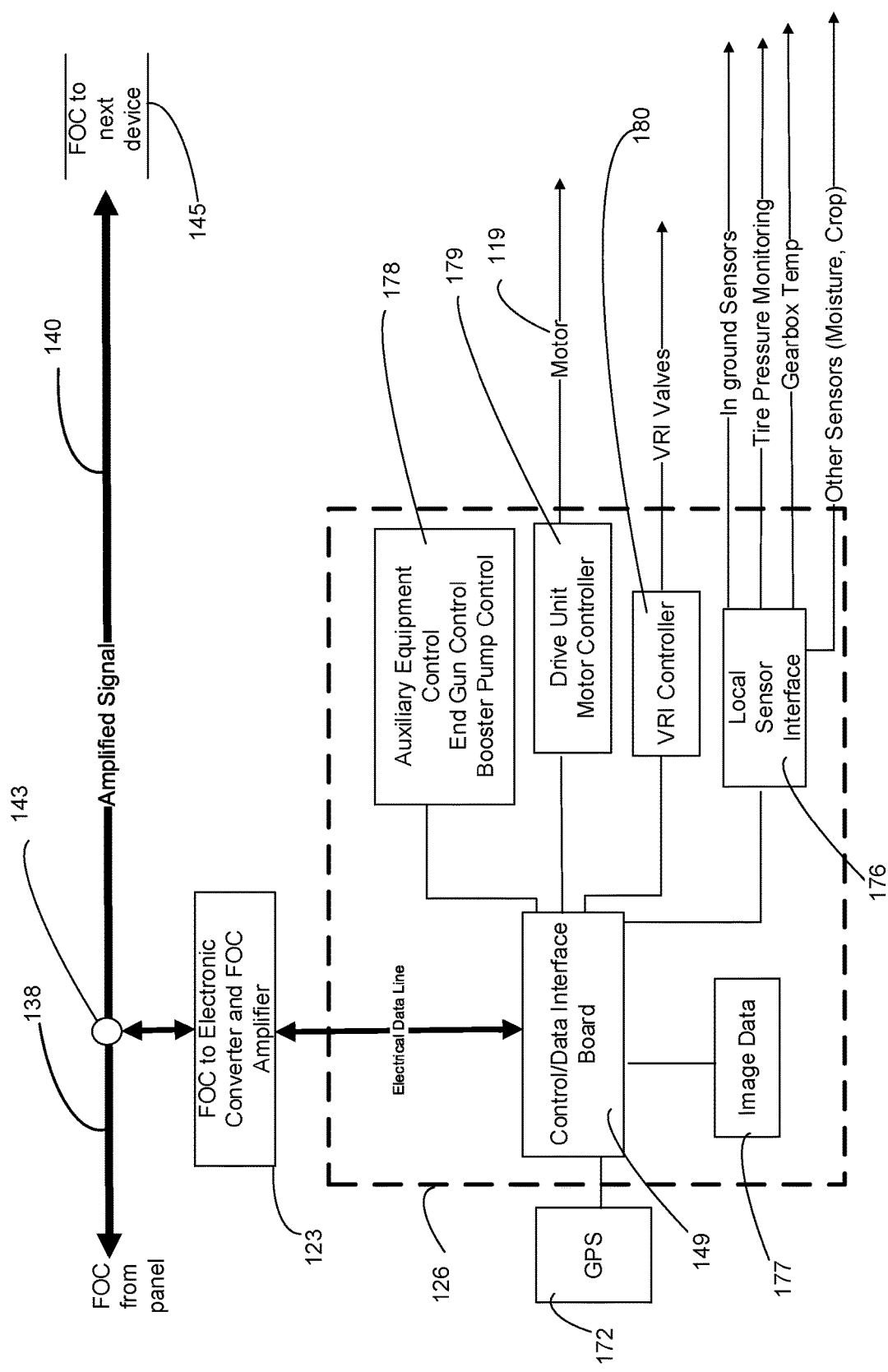
FIG. 5 shows a block diagram of a third portion of the exemplary system shown in FIG. 3A.

With reference now to FIG. 5, the fiber optic signals forwarded to the downstream fiber optic cable 138 are preferably then received by the second fiber optic component 143 which preferably splits and/or routes the signals to a second fiber optical converter 123 and any further downstream fiber optic cable(s) 140. At the second fiber optic converter 123, the received signal is re-converted to an electrical signal and routed to the controller/data interface board 149 within the pivot controller 126. The controller 149 may be linked to a wide variety of devices as discussed above including: a GPS device/module 172; image sensors 177; spray controllers 178; drive controllers 179; VRI controllers 180; and other connected devices 176. As shown, each drive unit control/data interface board 149 may preferably include an amplifier circuit or the like to allow each interface board (including any downstream interface boards or other connected components) to amplify and/or filter the optical signal for retransmission. Preferably, each of the interface boards 149 may be linked together so that each interface board 149 may exchange data with every other interface board or related machine component. According to preferred embodiments, this data exchange may be direct between components or may be broadcast between one or more components of the machine or remotely linked components.

Additionally, data transmitted and received may be utilized by equipment controllers such as end gun controllers and booster pumps, and for various crop sensors such as videos cameras, cameras and IR cameras for various proof-of-placement applications or ancillary devices for processing by the edge computer 150. The edge computer 150 may combine this data with data from the pivot controller board 144 and incoming data from the downstream links using pre-defined algorithms, machine learning or the like to create an action or response based on the incoming data. This action/response may then be transmitted down the machine via the fiber optic system for execution. Further, the received data may be combined to create an alert or warning.

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the processes for transmitting data within the present invention may be designed to be push or pull in nature. Still further, each feature of the present invention may be made to be remotely activated and/or accessed from distant monitoring stations. Accordingly, data may preferably be uploaded and downloaded from the present invention as needed.

Accordingly, the scope of the present invention should be determined not by the embodiments illustrated, but by the appended claims and their legal equivalents.

What is claimed is:

1. A system for providing two-way communications between components of an irrigation machine which includes at least a first drive tower and a second drive tower, the system comprising:

a pivot controller, wherein the pivot controller comprises a pivot control board;

a first optical signal converter, wherein the first optical signal converter is configured to receive electrical signals from the pivot control board; wherein the first optical signal converter is configured to convert the received electrical signals into optical signals and to transmit the optical signals;

a fiber optic rotary joint slip ring, wherein the fiber optic rotary joint slip ring is configured to receive optical signals from the first optical signal converter and to transmit the received signals onto a first optical cable;

a first optical component, wherein the first optical component is a first optical splitter; wherein the first optical splitter is configured to receive the optical signals from the first optical cable; further wherein the first optical splitter is configured to direct the optical signals to a first drive tower control box and to a second optical cable;

wherein the first drive tower control box comprises a first drive unit controller and a first optical converter; wherein the first optical converter is configured to receive the optical signals from the first optical cable, convert the received optical signals into first control signals, and direct the first control signals to the first drive unit controller; and a second optical component, wherein the second optical component is a second optical splitter; wherein the second optical splitter is configured to receive the optical signals from the second optical cable; further wherein the second optical splitter is configured to direct the optical signals to a second drive tower control box and to a third optical cable;

wherein the second drive tower control box comprises a second drive unit controller and a second optical converter; wherein the second optical converter is configured to receive the optical signals from the second optical cable, convert the received optical signals into second control signals, and direct the second control signals to the second drive controller.

2. The system of claim 1, wherein the first drive tower control box comprises a first transceiver; wherein the first transceiver is configured to transmit data to the pivot controller and to receive data from the pivot controller.

3. The system of claim 2, wherein the first transceiver is further configured to transmit data to the second drive tower control box and to receive data from the second drive tower control box.

4. The system of claim 3, wherein the first transceiver is configured to transmit multiple signals to multiple control boxes at the same time.

5. The system of claim 4, wherein the fiber optic joint slip ring comprises a drum slip ring.

6. The system of claim 4, wherein the fiber optic joint slip ring comprises a flat slip ring.

7. The system of claim 4, wherein the first drive unit controller produces first drive unit data; wherein the first transceiver is configured to transmit the first drive unit data back to the pivot controller.

8. The system of claim 7, wherein the first transceiver is configured to transmit the first drive unit data back to the pivot controller wirelessly.

9. The system of claim 8, wherein the first transceiver is a short hop radio transceiver.

10. The system of claim 9, wherein the pivot controller, the first drive unit controller and the second drive unit controller are configured to broadcast data between each other.

11. The system of claim 10, where the pivot controller comprises a pivot amplifier circuit, wherein the pivot amplifier circuit is configured to amplify one or more received signals.

12. The system of claim 11, where the first drive unit controller comprises a first amplifier circuit, wherein the first amplifier circuit is configured to amplify one or more received signals.

13. The system of claim 12, where the second drive unit controller comprises a second amplifier circuit, wherein the second amplifier circuit is configured to amplify one or more received signals.

14. A system for providing two-way communications between components of an irrigation machine which includes at least a first drive tower and a second drive tower, the system comprising:

a pivot controller, wherein the pivot controller comprises a pivot control board and a short hop radio transceiver; wherein the short hop radio transceiver is configured to receive electrical signals from the pivot controller board and convert the received electrical signals into wireless transmission signals; wherein the short hop radio transceiver is configured to transmit the wireless transmission signals to one or more drive towers;

a first drive tower control box, wherein the first drive tower control box comprises a first drive unit transceiver, a first drive unit controller, a first optical converter, and a first optical transmitter; wherein the first drive unit transceiver is configured to receive the wireless transmission signals from the short hop radio transceiver; wherein the first drive unit transceiver is configured to convert the received wireless transmission signals into first control signals and to direct the first control signals to the first drive unit controller; wherein the first optical converter is configured to convert at least a portion of the first control signals into first optical signals; wherein the first optical transmitter is configured to direct the first optical signals to a first optical cable; and a second drive tower control box, wherein the second drive tower control box comprises a second drive unit controller, a second optical converter, and a second optical transmitter; wherein the second optical converter is configured to convert the first optical signals into second control signals and to transmit the second control signals to the second drive unit controller; wherein the second drive unit controller is configured to receive the second control signals; wherein the second optical transmitter is configured to transmit at least a portion of the second optical signals to a second optical cable.

15. The system of claim 14, wherein the first drive unit controller produces first drive unit data; wherein the first drive unit controller is configured to transmit the first drive unit data back to the pivot controller.

16. The system of claim 15, wherein the first drive unit controller is configured to transmit the first drive unit data back to the pivot controller wirelessly via the first drive unit transceiver.

17. The system of claim 16, wherein the first drive unit controller is configured to transmit the first drive unit data to the second drive tower control box.

18. The system of claim 17, wherein the pivot controller, the first drive unit controller, and the second drive unit controller are configured to broadcast data to each other.

19. The system of claim 18, where the pivot controller comprises a pivot amplifier circuit, wherein the pivot amplifier circuit is configured to amplify one or more received signals.

20. The system of claim 19, where the first drive unit controller comprises a first amplifier circuit, wherein the first amplifier circuit is configured to amplify one or more received signals.

21. The system of claim 20, where the second drive unit controller comprises a second amplifier circuit, wherein the second amplifier circuit is configured to amplify one or more received signals.

* * * * *